James Powell.
FAUCET.
4338
REISSUED APR 11 187
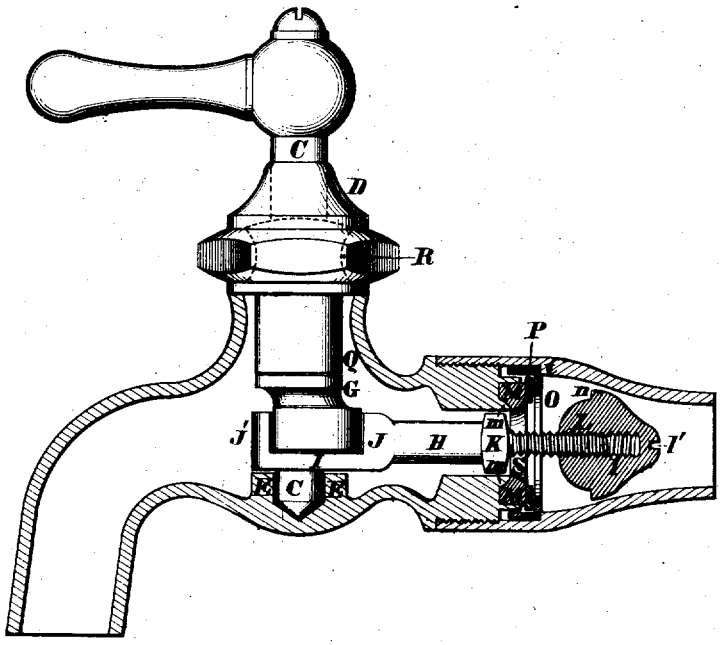
ATTEST
Jas L Ewin
Wm H Brereton Jr
James Powell
By Knight Bros
Attorneys

United States Patent Office.

JAMES POWELL, OF CINCINNATI, OHIO.

Letters Patent No. 25,348, dated September 6, 1859; reissue No. 4,338, dated April 11, 1871.

IMPROVEMENT IN FAUCETS.

The Schedule referred to in these Letters Patent and making part of the same.

I, JAMES POWELL, of Cincinnati, Hamilton county, Ohio, have invented a new and useful Improvement in Valve-Cocks, of which the following is a specification.

*Nature and Objects of the Invention.*

My said invention relates to the class known as valve-cocks; and consists in a peculiar combination of a guarded elastic valve-disk, a yielding-plate, and a valve-head, of metal or other hard material.

The object of my improvement is to produce an elastic valve-seat (or a plug) for cocks, in which compensation is provided for wear either of the seat or of the valve-plug, while at the same time the India rubber or equivalent material used to give elasticity to the parts shall be fully protected from the action of the fluid, the whole being so constructed and arranged that in the act of closing the valve upon its seat the greater the pressure the more effectually the elastic material shall be confined and protected by the bearing surfaces of the passage-way, and thereby excluded from contact with the fluid.

*General Description with Reference to the Drawing.*

The accompanying drawing is a vertical axial section of a valve Bibb cock embracing my improvements, some of the parts being shown in elevation.

The operating-stem C *c*, cap D, elastic packing G Q R, cam F, socket E, spur K, and head I J J of the valve-stem may be similar in construction and operation to the corresponding parts described in the reissue of my patent of March 22, 1859.

S is an annular elastic valve-disk, composed wholly or partly of vulcanized rubber or analogous material.

Fitted in a socket between the concentric rims M *m* in the body or in the shank of the cock L, as shown, is a metallic-plug valve, with a threaded aperture, *i*, adapted to fit a male-thread on the rear end of the valve-stem H.

*i* is a slot in the back of the plug, by means of which it can be adjusted and fixed to any part of the stem with a common screw-driver; or the head of the plug may have a square or other non-circular end, for use with a common wrench.

P is a flexible plate of metal interposed between the valve and its seat, and having an aperture.

O is a collar, which slightly overlaps the edge of the plate P.

This collar is adapted to slide upon the outside of the rim M, and is confined by an internal shoulder, *t*, in the shank of the cock, in connection with which it also acts as a friction-washer.

The valve-head L has an annular enlargement, *n*, which in the act of closing bears against the outer edge of the yielding plate P, and acts a a compressor against the elastic disk S.

*Operation.*

The valve being advanced by rotating its operating-stem C *c*, its salient or conical portion is forced into the aperture in the valve-seat at the same time that the shoulder *n* engages with the yielding-plate P, and thereby compresses the rubber disk, which, being confined from lateral displacement by the rim M and flanged collar O, and by the inner rim *m* and valve-head L, is prevented from encroaching upon the passage-way, and is forced against the valve so as to form a perfectly fluid-tight joint without exposure in any part to the action of said fluid.

The cylindrical flange of the collar O may be slightly elongated so as to take the place of the outer rim M, and the annular plate P may be in one piece with the said collar, its aperture being of such size as to afford a bearing for the shoulder *n* of the valve-head L, so as to insure the equable and uniform compression of the rubber disk and the perfect exclusion of the fluid therefrom in the act of closure.

It is evident that this invention is equally applicable to every variety of faucet, such as stop-cocks, Bibb cocks, globe-valves, and steam and water-cocks of every description, and also that the valve may be adapted to close either with or against the pressure or flow of the current.

I do not propose to confine myself to the precise arrangements above selected so long as I attain the same result by means substantially equivalent; for example, the seat of the cock may be of hard material and of conical or conoidal shape, as in the drawing, while the elasticity sought for can be wholly in the valve-head L by placing the yielding or sliding plate P on the valve-stem H, so that its outer rim may engage with the conical walls of the passage-way, so as to confine the rubber disk between said plate and the false head L, the complete protection of the elastic disk and its compression against the sides of the passage in the act of closing being precisely the same in either case.

It is obvious, also, that the operating-stem C *c* and valve-stem H may be displaced by the ordinary rotating screw-spindle, as in the common compression-cock, and the projecting enlargement or shoulder *n* of the valve-head L, and the outer edge of the plate P with which it engages, may, if preferred, be cone-shaped on their bearing surfaces.

The following are among the advantages of this description of cocks:

The construction is simple, economical, and exempt from liability to derangement.

The parts can be separated with great facility for inspection, cleansing, or repair.

The valve-seat or valve is effectually preserved from contact with the fluid while the cock is closed, and as much as possible from attrition against any of the moving parts when open or in action; and the elastic disk, whether in the seat or valve proper, is readily replaced when worn, vulcanized rubber in the sheet being an article of general merchandise.

The valve is readily adjustable upon its stem to compensate for the general wear of its parts, and this without any perforation through it to cause leakage.

The tight joint between the plate P and the enlargement *n* effectually excludes any fluid from contact with the rubber disk or with the screw by which the valve-head is held in place.

I am aware that cocks have been constructed having elastic plug-valves composed of India rubber or analogous gums, but the plugs of such cocks have been composed almost entirely of solid rubber, with capacity for lateral expansion and unrestricted contact with the fluid, as well as attrition against the seat. The rubber, under these circumstances, has been found subject to rapid deterioration, involving considerable expense in repair, such plugs being cast complete in separate molds and afterward vulcanized, and, consequently, much more costly than my packing or cushion, which can be cut out of the sheet, as before stated.

I know of no cock having either the seat or valve proper protected from contact of the fluids and at the same time so constructed as to combine the elements of metal or other hard material, and an elastic cushion behind or in rear of one or more of the bearing surfaces, so as to insure compensation for wear either to the metal plates or to the rubber.

*Claims.*

I claim as new and of my invention—

1. The elastic annular valve-disk or seat S and yielding plate P, in combination with the valve-head L, of hard material, substantially as set forth.

2. The sliding collar O, in combination with the elastic valve-disk or seat S and valve-head L, as and for the purposes set forth.

In testimony of which invention I hereunto set my hand.

JAMES POWELL.

Witnesses:
GEO. H. KNIGHT,
JAMES H. LAYMAN.